United States Patent [19]

Ugon

[11] Patent Number: 5,341,421
[45] Date of Patent: Aug. 23, 1994

[54] SECURITY DEVICE, INCLUDING A MEMORY AND/OR A MICROCOMPUTER FOR DATA PROCESSING MACHINES

[75] Inventor: Michel Ugon, Maurepas, France

[73] Assignee: Bull CP8, Trapps, France

[21] Appl. No.: 852,267

[22] PCT Filed: Nov. 5, 1991

[86] PCT No.: PCT/FR91/00865
§ 371 Date: Jun. 8, 1992
§ 102(e) Date: Jun. 8, 1992

[87] PCT Pub. No.: WO92/08181
PCT Pub. Date: May 14, 1992

[30] Foreign Application Priority Data

Nov. 6, 1990 [FR] France ................ 90 13727

[51] Int. Cl.⁵ .............................................. H04L 9/00
[52] U.S. Cl. ............................................ 380/4; 380/25; 380/52
[58] Field of Search ............................. 380/4, 23–25, 380/52; 340/825.31, 825.34

[56] References Cited

U.S. PATENT DOCUMENTS

| 4,924,378 | 5/1990 | Hershey et al. | 380/4 |
| 4,942,606 | 6/1990 | Kaiser et al. | 380/25 |
| 5,210,571 | 5/1993 | Peloquin et al. | 380/4 |
| 5,212,729 | 5/1993 | Schafer | 380/25 |

Primary Examiner—Salvatore Cangialosi
Attorney, Agent, or Firm—Kerkam, Stowel, Kondracki & Clarke

[57] ABSTRACT

The invention relates to a portable user controlled pointing peripheral device enabling connection of a memory and/or microcomputer module (44) to a processing machine, without requiring a specific connector and/or interface circuit, while preserving the portable nature of such a module. The main characteristic of the invention resides in the fact that the device additionally constitutes a pointing peripheral (47, 48, 49), such as a "mouse", and the electronic circuits of the device are arranged to use conductors (RXD, TXD, RTS, DTR) which are shared between the machine and the device in order to permit the use of the pointing functions and the use of the functions of the module.

7 Claims, 6 Drawing Sheets

SECURITY DEVICE, INCLUDING A MEMORY AND/OR A MICROCOMPUTER FOR DATA PROCESSING MACHINES

The invention relates to a portable user controlled pointing peripheral such as a "mouse" including a security device for making it possible to protect the data of one or more data processing machines, of the type including at least one memory and/or microcomputer external to the processing machine, so as to permit an exchange of data between the processing machine and the memory or microcomputer of the security device.

BACKGROUND OF THE INVENTION

The state of development of personal or office information processing applications makes manifest an increasingly frequent need to manipulate data that must in some cases remain confidential. The data in such systems are generally stored on highly vulnerable media, such as memories, diskettes, magnetic tape, or even hard disks.

To lend the data a certain confidentiality, protecting them with the aid of passwords has already been proposed. The principle of this is as follows: A user can access an application involving particular data only by using a password, that is, by introducing a succession of alphabetical or numerical or alphanumeric terms with the aid of a keyboard or any other suitable input means. Such a method is not especially reliable, because methods for making it possible for recovering the password, or even circumventing it, exist which makes "pirating" of the application relatively easy.

Another method of protection consists in removing the medium containing the data physically at the end of each application in question. This assumes extreme rigor on the part of the user, and can be considered only if the medium containing the data is removable—which a priori precludes the case in which the data are on the hard disk—and if the medium can be locked up in a secure location after having been removed. Additionally, this is not truly practical unless furthermore, only a single user is capable of manipulating the data in question.

The problem of data protection is accordingly crucial. This is all the more true as lightweight portable computers, which can easily be transported to do work, in particular while traveling, become increasingly more widely used. It is in fact not a rare occurrence by now to see persons using such a machine at the offices of a client, to save time during a transaction or a negotiation. In the absence, however brief, of the user, third parties can profit from the situation by attempting to pierce some of the secrets of the machine, particularly the secrets of the files incorporated in the machine.

The disadvantages of earlier methods have been overcome by proposing the use of memory and/or microcomputer cards, also known as "smart cards" like those described in French Patents 2,401,459 and 2,337,381, corresponding to respective U.S. Pat. Nos. 4,211,919 and 4,222,516, in order to provide extremely certain control of the rights of the user or to protect the files. The subject matter of U.S. Pat. Nos. 4,211,919 and 4,222,516 is hereby incorporated herein by reference. The card, or an equivalent portable medium, contains an electronic memory, with secret data, for instance, which are used in processes of verification of the rights of the bearer, or again in processes of memorizing or encoding/decoding of the data to be protected.

Verification or security methods that employ portable articles, such as memory and/or microcomputer cards, are numerous and are not the subject of the present invention. Some control the rights of the bearer by encoding the data to be protected. Others prohibit starting an application unless the card has not been read and the data it includes have been combined with the data to be protected. This latter method is the subject of French Patent 2,523,745, corresponding to U.S. Pat. No. 4,683,553, and provides for associating a memory and/or microcomputer card with applications software. The card contains the information necessary for starting the software and prior dialog between the card and the processing apparatus is necessary. Without it, the applications software cannot be employed.

It should be noted that depending on the degree of security required, a memory and/or microcomputer card or equivalent article, because of its great flexibility of use, makes it possible to use one or another of the methods mentioned, or to combine all or some of these methods.

Consequently, a memory and/or microcomputer card or any equivalent medium makes highly secure information processing applications possible.

However, when one seeks to use a portable article in connection with a computer, a specialized external reader, connected by way of an available interface on the processing machine, must be used. In certain computers, for example, the specialized reader is connected to the machine by a standard V24 or RS232 interface. Aside from its cost and its bulk, a reader of this kind accordingly occupies one output of the machine, which then is unavailable for other purposes. Hence connecting the reader can prevent connecting some other useful resource or peripheral, such as a printer, telephone line, or network.

To overcome these disadvantages, some manufacturers have proposed incorporating the reader in the machine, so that it does not occupy an output of the machine. However, this provision can be considered only if it has been provided for in the design of the machine, because physical interfaces and the slot for the reader must be provided. A reader must accordingly be adapted to a given type of machine, which is not ideal, particularly if the machine is a sophisticated one.

A solution consists in providing an additional output for a reader of cards or equivalent portable articles. This, however, would also require modification of the physical interfaces, which is not cost effective, because the security device is generally used only for a limited period at the time an application is started or finished. Hence its time in use is extremely short compared with the time the machine is used. Moreover, some users have no need for such a device and would not want to bear the additional cost entailed in providing for the existence of this output.

Accordingly, a first object of the invention is to overcome all the disadvantages in terms of connection or location, while using a security device that employs at least one memory and/or microcomputer, so as to preserve the advantages and potentials of such a device.

Moreover, a second object of the invention is to achieve a device capable of being easily connected, at low cost, to all types of mutually compatible machines, without requiring modification of the existing physical interfaces.

A third object of the invention is to preserve the portable aspect of the security device, so that, if a user does not want to travel with his own computer, the user can carry the security device with him, as he does a memory and/or microcomputer card or equivalent medium, and yet still preserves the security of the applications he uses, wherever he may be, by connecting the security device to the machine he uses.

A data processing machine, such as an office or personal computer, includes a central processing unit and associated peripherals. The central processing unit includes a processor and data (RAM) or program (ROM) memories necessary for its function. The peripherals either make it possible to keep a record of the processing done (mass memories, hard disks, diskettes, tape), or enable dialog between the user and the machine (keyboard, screen, printer) or between the machine and the external environment (input/output connectors). Depending on the configuration, some peripherals may be incorporated physically in the same block as the central processing unit. Hence a portable computer, for instance, will have a keyboard, screen, central processing unit, and optionally a hard disk or diskette reader, and a modem in the same block. In other configurations, in a manner known per se, the central processing unit is physically separate from all or some of the peripherals. In that case, the central processing unit then includes interface circuits connected to the specific input/output connectors for each additional peripheral that may be connected to the machine.

SUMMARY OF THE INVENTION

The objects of the invention are attained by using a peripheral, as a basis for the security device, which is not incorporated inside a processing machine but contrarily is externally connected, and which is lightweight, small in size, and consequently easily transportable, and for which the connection is generally provided on any type of machine.

According to the invention, a peripheral device for a data processing machine, including means for causing a memory and/or a microcomputer module external to the machine to function is used to permit an exchange of data between the machine and the module, while assuring the security of applications or data processed by the machine. The invention is characterized in that it constitutes a portable, user-controlled pointing peripheral, with means for connecting it to the processing machine, and in that it includes an electronic circuit with means for using shared conductors between the processing machine and the peripheral device, in order to receive the electrical signals from the processing machine necessary for the peripheral device to function as a pointing peripheral and those necessary for the function or operation of the memory and/or microcomputer module, and to furnish the electrical signals to the machine originating from the peripheral device when it functions as a pointing peripheral and from the function or operation of the memory and/or microcomputer module.

A pointing peripheral is more particularly adapted for achieving all the objects of the invention together. It is in fact a peripheral device, the provision of which is practically always planned for in a processing machine, regardless of its configuration. It is a device that among other purposes enables a cursor to be shifted about on the display screen associated with the machine, in order to facilitate dialog between the user and the machine in certain applications. The operating principle of a pointing peripheral is known per se. It involves converting a command, invoked by the user with the aid of the pointer peripheral, by displacing the cursor on the screen. Other uses are known, such as zone validation on the screen or sending certain commands.

A first type of known pointing peripheral is called a "mouse". This is a device that the user moves about on a plane, and it includes at least one ball or an optical pickup. The cursor displacement is slaved to the displacement of the peripheral. When the cursor reaches the desired position, the user validates the new position using a button, provided on the housing of the mouse, or a key of the machine keyboard. Advanced mice include other buttons making it possible to increase the number of operations that can be performed with this device.

Another known device is a data entry ball (known as a "trackball"). Its operating principle is similar to that of the mouse, with one small difference. The user, instead of displacing the device on a plane, manipulates the ball directly to obtain the desired displacement of the cursor. Validation is obtained in the same manner as with a mouse, using a button associated with the housing that encloses the ball, or pressing on the ball itself, or with the aid of the machine keyboard.

Accordingly, to achieve the support of the memory and/or microcomputer module, it is possible to use either the housing of a mouse, or an equivalent device in the form of a ball manipulated directly by the user.

In one embodiment, the memory and/or microcomputer is incorporated permanently in the pointing peripheral.

In another embodiment, the memory and/or microcomputer is incorporated in a removable medium, and the mouse or equivalent device then includes means for receiving the removable medium and permitting the electronic connection of the module and the necessary connection to the electronic circuit of the mouse or equivalent device.

BRIEF DESCRIPTION OF THE DRAWINGS

Other characteristics and advantages of the invention will become apparent with the ensuing description, taken in conjunction with the accompanying drawing figures, in which.

DETAILED DESCRIPTION OF THE DRAWINGS

Figure 1:
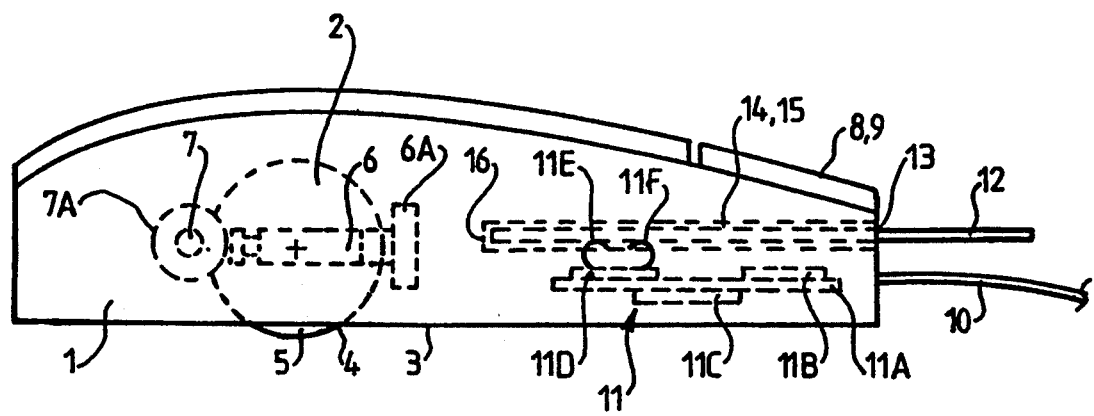
FIGS. 1 and 2, respectively, are a side and top view of a first embodiment of the device according to the invention.
Figure 2:
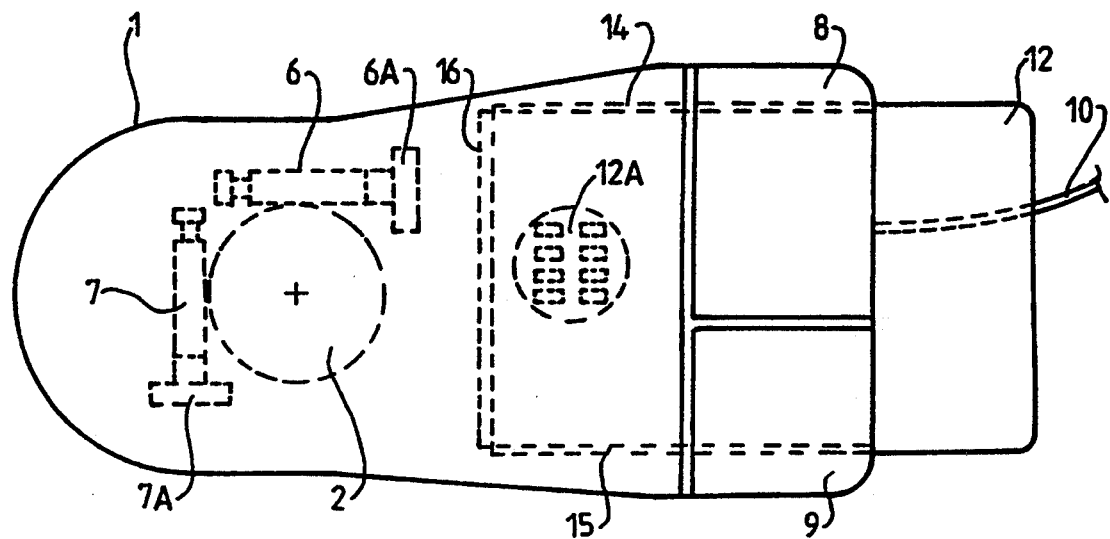

FIGS. 1 and 2, respectively, show a side view and a top view of a pointing peripheral constituted by a mouse whose pickup uses a ball, the housing of which is adapted to receive a portable article such as a memory and/or microcomputer card, enabling the use of a processing machine, such as a portable, home or office computer, in a secure fashion.

The mouse is constituted first by a housing (1), of plastic material, for example, which has an ergonomic shape, to enable it to be held in the user's hand. Inside the housing (1) is a receptacle (not shown) containing a ball (2). The lower face (3) of the housing includes a circular opening (4), through which part (5) of the ball (2) projects, so that when the mouse is displaced on a surface parallel to the lower face and which preferably is a horizontal surface, the ball then rolls on this surface. The ball is in contact with two cylindrical rollers (6, 7) carried inside the body of the mouse in a manner well known in the art. The rollers (6, 7) are driven in rotation by the ball when it is displaced. Each roller (6, 7) is connected to an associated encoding means (6a, 7a), such as a rotary encoder, connected to an electronic device incorporated in the body of the mouse, such that the movement of the ball is converted into an electrical signal representing the displacement of the ball on the horizontal plane surface. At least one button (8, 9) is accessible on the top face of the housing of the mouse, at one end thereof, and is electrically connected to an electronic assembly (11) incorporated inside the housing (1) of the mouse, to enable dialog with the processing machine. The mouse described above to this point is known per se, having been described in numerous patents or publications. A cord (10) which, for ergonomic reasons, is generally located at the end of the mouse nearest the buttons (8, 9), enables the connection of the mouse to the processing machine by way of an interface link, such as a standard V24 or RS232 interface link.

The electronic circuit (11) incorporated inside the body of the mouse accordingly enables the usual pointing functions, and, in accordance with the present invention, is additionally arranged to enable the use of an electronic medium, such as a memory and/or microcomputer card (12).

The electronic assembly (11) incorporated inside the body (1) includes, for example, a printed circuit (11A) and electronic circuits (11B, 11C), making it possible to assure both the control of the position of the pickup and the exchange of information with the electronic medium (12).

Figure 6:
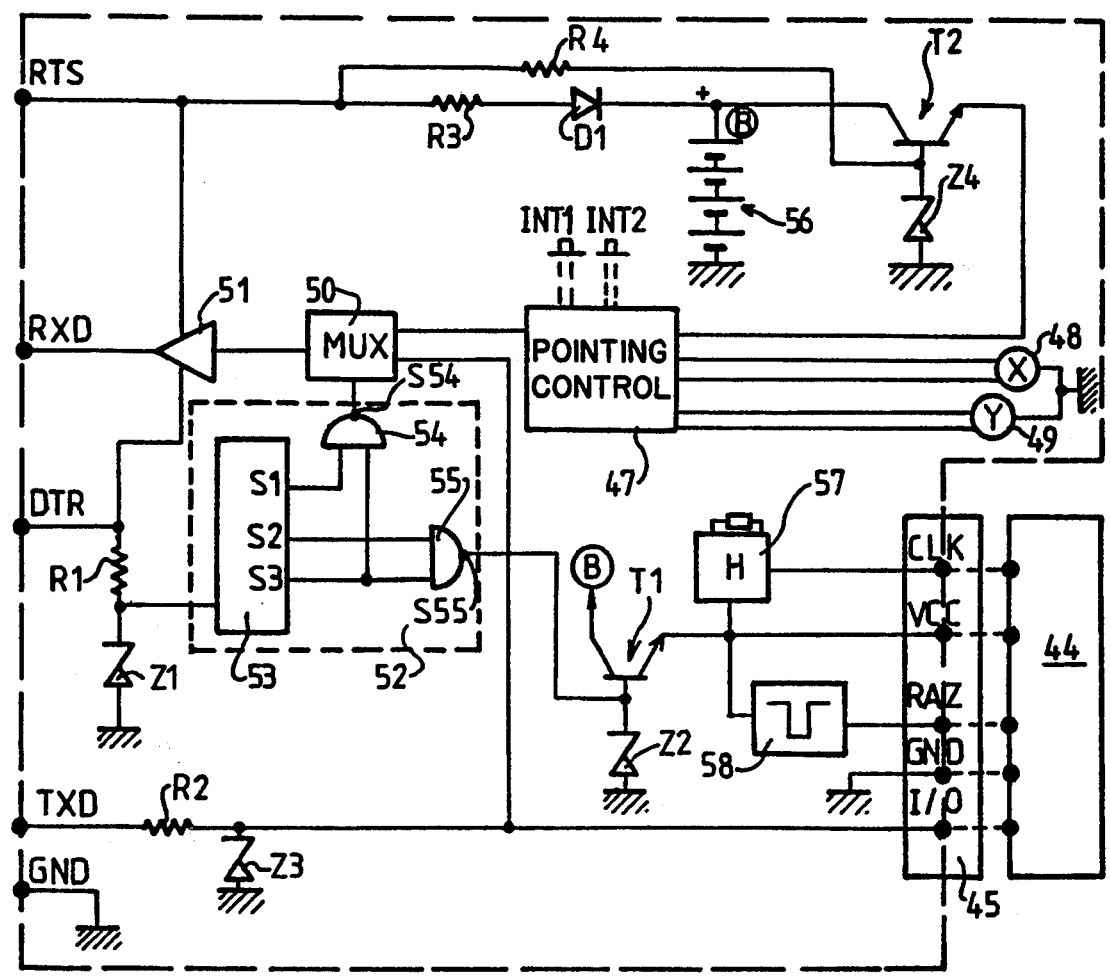
FIGS. 6, 7, 8 illustrate three possible embodiments of an electronic circuit that enables the operation of the device according to the invention.
Figure 8:
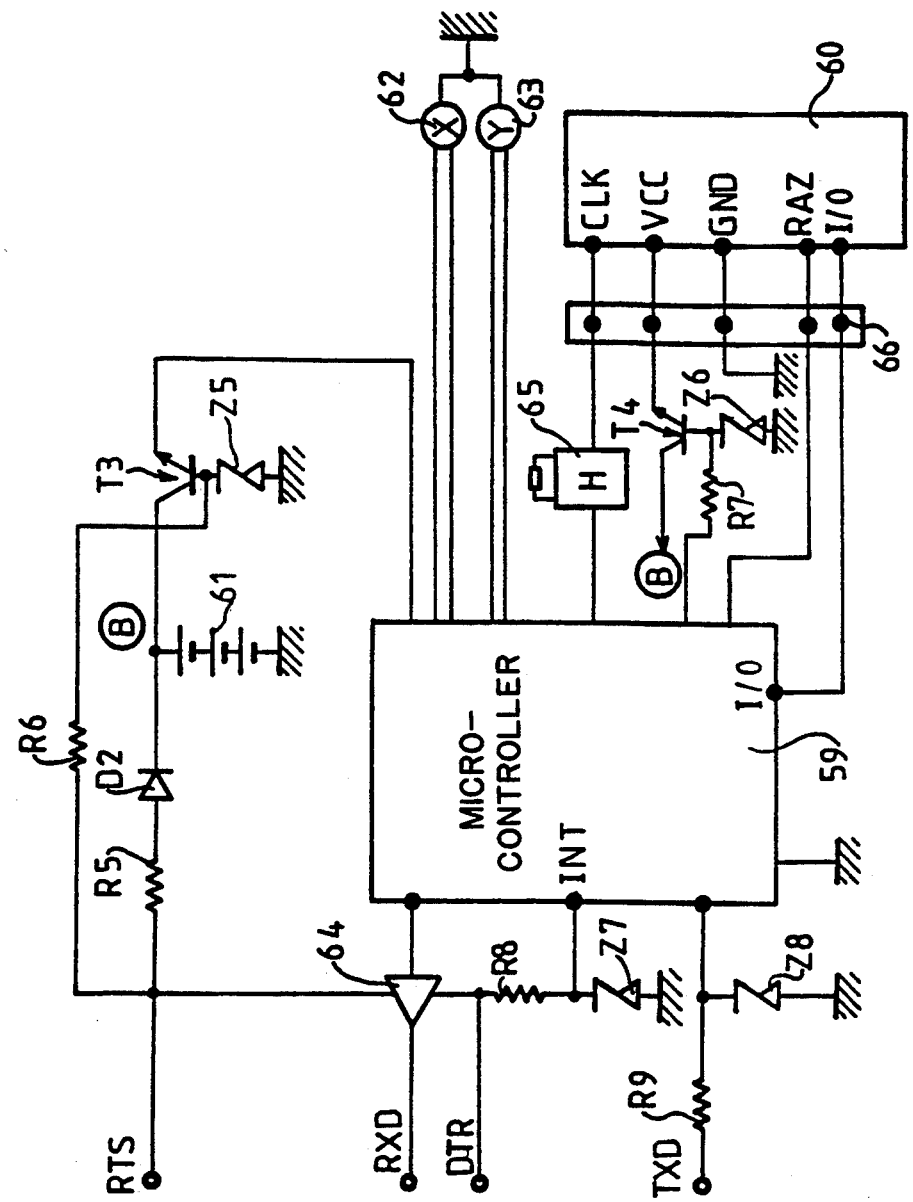

A first basic diagram of an electronic circuit which may be incorporated inside the body of a mouse is illustrated in FIG. 6, and a second embodiment is illustrated in FIG. 8. These will be described hereafter.

An electronic medium (12), such as a memory and/or microcomputer card, includes a plastic body of rectangular shape, in which an electronic assembly (12A), currently known as a contact assembly or flat package is incorporated. The flat package includes the electronic circuits of the portable article (12), that is, the memory and/or the microcomputer, and contact zones enabling the electrical connection of the electronic medium to the outside. The shape of the electronic medium may or may not be standardized, and the electronic contact zones are disposed accordingly.

The body of the mouse is arranged so that the portable article (12) can be introduced into it, and so that the memory (or memories) and/or the microcomputer of the electronic medium can be put into electrical contact with the electronic assembly (11) incorporated inside the mouse. To this end, an opening (13) is included, preferably at the end of the body of the mouse where the cord (10) exits, that is, underneath the buttons (8, 9), for example. This arrangement makes it possible for the user of the mouse constructed in accordance with the present invention to have the same ease of use and movements as with a conventional mouse.

The opening (13) that receives the portable article (12) is associated with guide means for the electronic medium, such as lateral slide rails (14, 15), and stop means (16) that makes it possible to stop the movement of the medium once it is in place. Making of the opening (13), the guide means (14, 15) and the stop means (16) is within the competence of one skilled in the art, so that it is unnecessary to expand the description on this point.

The printed circuit (11A), carrying the electronic circuits (11B, 11C) also has connection means (11D) enabling the electrical contact between the electronic assembly (11) and the contact zones of the flat package (12A). The connection means (11D) for instance include contact blades, two of which (11E, 11F) are visible in FIG. 1.

The arrangement shown in FIGS. 1 and 2 thus makes it possible for a portable article (12), such as a memory and/or microcomputer card, to be inserted by sliding it inside the body of the mouse, and enables the electrical connection to be already established once the portable article (12) is in place.

Figure 3:
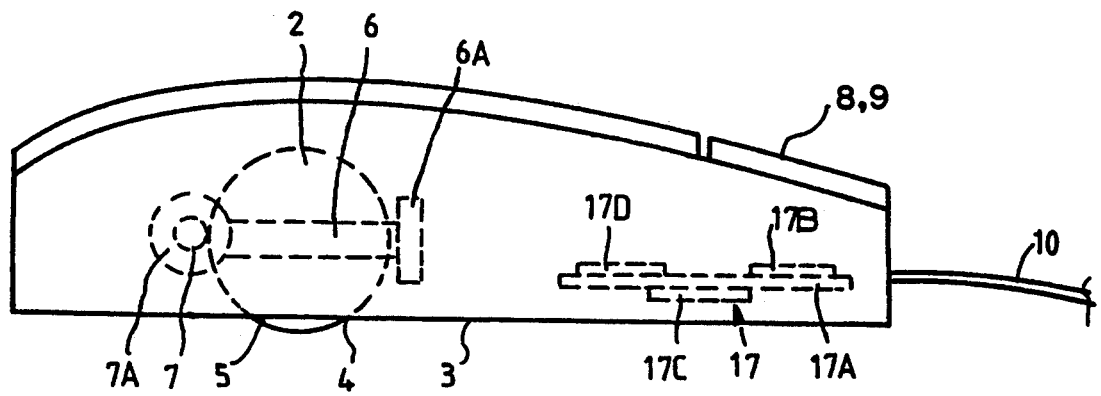
FIGS. 3, 4, 5 show three variants of the device according to the invention.

FIG. 3, in a side view, shows a variant embodiment of a security device for a data processing machine, made on the basis of a mouse, but in this embodiment the electronic medium containing the security circuit, that is, at least one memory and/or microcomputer, is not removable but rather is incorporated inside the housing (1) of the mouse. Otherwise, the device shown in FIG. 3 includes many elements that are identical or similar to those of FIGS. 1 and 2 and are, accordingly, described with like reference characters.

In particular, the mouse includes a housing (1) in which a ball (2) is in contact with interior rollers (6, 7), the rotary motion of which is transformed into electrical signals with the aid of potentiometers (6A, 7A). The ball (2) communicates with the outside through an opening (11) made in the lower wall (3) of the housing. Moreover, at least one control button (8, 9) is located on the upper face of the housing of the mouse, preferably toward the vertical wall where the connection cord (10) exits to the outside.

An electronic assembly (17) constituted by a printed circuit (17A) with electronic components (17B, 17C, 17D) is incorporated inside the housing. The role of the circuits (17B, 17C) is to assure dialog both between the mouse and the processing machine when they are connected to one another and between the security circuits and the processing machine. The security circuits, constituted by at least one memory and/or one microcomputer, are the circuits identified by reference numeral (17D), in the variant embodiment of FIG. 3.

It is understood that the memory and/or the microcomputer incorporated in the circuit (17D) may have a structure similar or identical to that encountered in microcircuit or smart cards, for example in those described in the aforementioned patents, and hence similar to that of the card in FIGS. 1 and 2. As with the variant embodiment of FIGS. 1 and 2, the complete electronic structure of electronic assembly (17) will be described hereinafter in conjunction with FIGS. 6 and 7.

Figure 4:
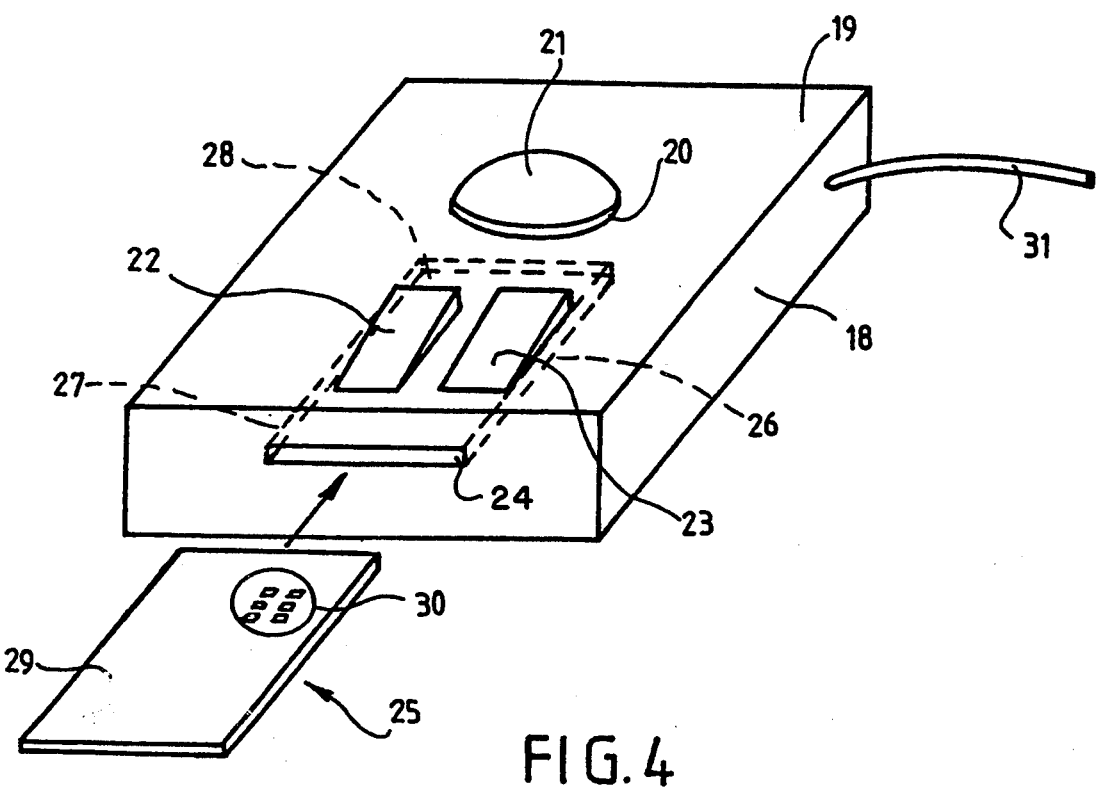

FIG. 4, in a perspective view, shows a security device according to the invention, incorporated in a data entry ball, or trackball. The security device is constituted by a housing (18), whose upper face (19) is pierced by an opening (20) from which a ball (21) protrudes. As in the case of a mouse, the rotational motion of the ball (21) is transmitted to electrical pickups such as rotary encoders, which are connected to an electronic circuit (not shown in the drawing) and incorporated inside the housing (18).

Two control buttons (22, 23) have been shown on the upper face (19) of the housing. These control buttons (22, 23) have the same functions as the buttons (8, 9) of the mouse shown in FIGS. 1, 2 and 3. These buttons are not, however, absolutely necessary, and the displacement of a cursor may be validated by way of a key on the keyboard with which all processing machines are equipped, or by touching a touch screen, when the machine is so equipped, or by pressing on the ball itself.

An opening (24) is made in one of the vertical walls of the housing to enable electrically connecting the electronic circuits of a portable article (25), such as a memory and/or microcomputer card, to the electronic circuits incorporated inside the housing. The electronic circuit incorporated inside the housing may be identical or similar to that (11) incorporated inside the body (1) of the mouse of FIGS. 1 and 2. Furthermore, if the portable article takes the form of a rectangular card, then the slot (24) is extended by means that enable the card to be inserted, for example by translation, inside the box. These means are for example constituted by slide rails (26, 27) and stop devices (28), as schematically shown in dashed lines in FIG. 3.

When the portable article (25) is a card having the size and shape of a credit card, the portable article (25) may have the structure described in conjunction with FIGS. 1 and 2 and in the aforementioned patents. Thus it would include a body (29), in which a flat package (30) is incorporated constituted by the electronic circuit (memory and/or microcomputer) and by the external contact zones that appear on one of the faces of the body (29) and enable its contact with a connector, such as a connector with blades incorporated inside the housing.

Finally, the connection between the housing (18) and the processing machine is made by way of a cord (31) having a plurality of conductors, the detailed description of which will be given hereinafter.

Figure 5:
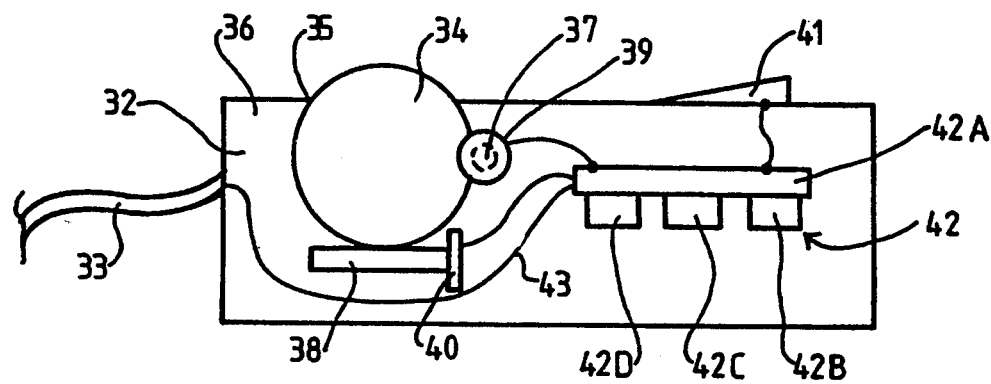

In FIG. 5, a further variant embodiment of a security device based on a data entry ball has been shown schematically. The device includes a housing (32) that can be connected to the processing machine by way of a connection cord (33). A data entry ball (34) is accessible to a user's fingers or hand via an opening (35) made in the upper face (36) of the housing. The ball is in contact with two rollers (37, 38), which enable converting the displacement into an electrical magnitude. To this end, the rollers (37, 38) are for example connected to encoders (39, 40), respectively. At least one data entry button (41), accessible via the upper face (36) of the housing, may be present.

An electronic assembly (42) is incorporated inside the housing. Conductors (43) originating in the linking cable (33), and encoders (39, 40), or more generally the electrical means enabling conversion of the movement of the ball into electrical signals are connected to the assembly (42). The control buttons (41), when present, are also connected to the electronic circuit (42).

The operative connection of the various elements that have been described above to the electronic circuit (42) is done by means of a printed circuit (42A), for example, which is part of the electronic circuit (42), and which moreover carries active electronic elements (42B, 42C, 42D). The elements (42B, 42C, 42D) in fact embody the active parts of the electronic circuit (42).

A first part (42B) enables assuring the management or processing of the motions of the ball. A second part (42C) includes the memory and/or the microcomputer assuring the security, along with the accompanying electronic circuits necessary for its operation. The third part (42D) assures the interface between the first two parts.

Naturally, one could imagine that all the parts (4 2B, 42C, 42D) are embodied in a monolithic integrated circuit or in any other way. The only condition is that the electronic circuit (42) be capable of assuring the management of the motions of the ball and the management of the security memory and/or microcomputer.

FIG. 6 shows an embodiment of an electronic circuit that can be used in the devices described in conjunction with FIGS. 1, 2 and 4.

Figure 7:
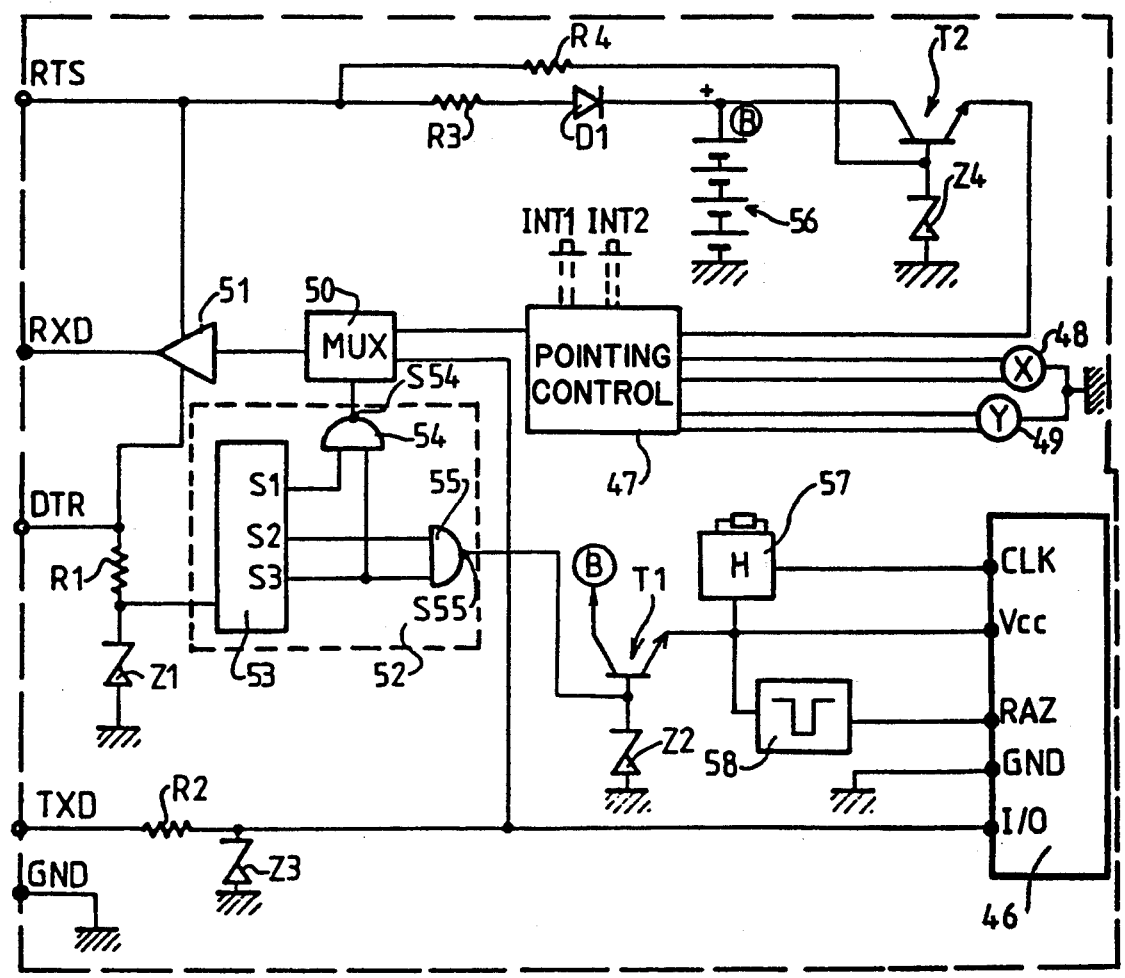

FIG. 7 illustrates a possible embodiment of an electronic circuit that can be used in the devices of FIGS. 3 and 5.

The difference between FIGS. 6 and 7 resides simply in the fact that in the case of FIG. 6, the memory and/or microcomputer module (44) is removable, and consequently the electronic circuit includes a connector (45) enabling the contact zones of the memory and/or microcomputer module (44) to be connected to the corresponding conductors of the electronic circuit, while in the case of FIG. 7, the module (46) is part of the electronic circuit, and its contact terminals are connected directly, for example by welding or soldering, to the corresponding conductors of the electronic circuit. Other than this, the electronic circuits of FIGS. 6 and 7 are identical, and consequently like elements are identified with like reference numerals.

The electronic structure and the operation of a module, such as an electronic memory and/or microcomputer device, are not the subject of the present invention.

For this purpose, reference may be made to U.S. Pat. Nos. 4,211,919 and 4,222,516. Nevertheless, for its operation, such a device requires an external supply voltage Vcc, a clock signal CLK, and a reinitialization signal RAZ for the circuits it incorporates, and it furthermore has at least one data input/output terminal I/O, as well as a terminal for ground connection.

Consequently, the electronic circuits of FIGS. 6 and 7 include subassemblies of circuits that enable furnishing the various signals that have just been mentioned to the modules (44, 46). In the case of FIG. 6, the connection between the main circuit and the module is done by way of the connector (45), which then includes appropriate contact zones, which establish proper connection with the contact zone of the memory and/or microcomputer card. In the case of FIG. 7, the terminals of the module are connected directly to the corresponding conductors of the circuit.

A manual portable data entry pickup, such as a mouse or a trackball, is connected to the processing machine by way of a cord (10, 31, 33) (FIGS. 1, 2, 3, 4, 5) and uses five conductors, named RTS, RXD, DTR, TXD, GND, respectively. The invention uses these five conductors exclusively in a manner adapted to the operation of the device. In examples shown in FIGS. 6 and 7, the conductor RTS serves to produce the positive supply voltages for the various components of the circuit. The conductor RXD is used for the output of the signals originating from the position pickup, constituted by the ball (or the equivalent optical device), and for the output of the signals of the module (44, 46). The conductor DTR normally serves to supply negative voltage to the components that require it, and in the context of the present invention it is used in a particularly judicious manner to control the mode of operation of the entire device, that is, to put the device into either the entry position or the module position, or in a pickup position enabling the module to operate. The conductor TXD is used to send messages in the direction of the module, when the module is in operation, and finally the conductor GND is the ground conductor, serving to connect the ground of the device to that of the processing machine to which it is connected.

In a manner known per se, the electronic circuit includes a pickup controller (47), which at some of its inputs receives the electrical signals for the position of the ball that are output by the pickups (48, 49), which for example are the rotary encoders (6A, 7A) of FIGS. 1, 2, 3 or (39, 40) of FIG. 5, as has already been explained above. By the signals that it outputs, the pickup controller, in a manner known per se, enables the processing machine to determine the new position of the manual pickup following any displacement of it. One of the decoders (48) makes it possible to determine the displacements along an axis X, corresponding for example to the horizontal axis of the screen, while the second encoder (49) makes it possible to determine the displacements along a second axis perpendicular to the first, for example the vertical axis of the screen.

The pickup controller (47) has also been shown connected to two buttons (INT1, INT2), corresponding to the buttons (8, 9) of FIGS. 1, 2, 3, (22, 23) of FIG. 4, or (41) of FIG. 5. Thus as already explained, these buttons are not necessarily present, because validation of the pickup position, or dialog, can be done with the aid of appropriate keys of the keyboard with which a processing machine is provided. Finally, the pickup controller (47) receives a supply voltage Vcc by way of the conductor RTS and from an appropriate electrical circuit that will be described in further detail hereinafter. The output of the pickup controller (47) is connected to a first input of a multiplexer (50), whose other input receives the signals output by the input/output terminal I/O of the module (44 or 46). The output of the multiplexer (50) is connected to one input of an operational amplifier (51), whose positive supply voltage (normally +12 V) is furnished via the conductor (RTS), and whose negative voltage is furnished via the conductor DTR. The output of the operational amplifier is connected to the conductor RXD. The control input of the multiplexer (50) is connected to the output of a logic circuit (52), the output state of which enables the conductor (RXD) to receive either the signals originating in the pickup controller (47) or the signals originating in the module (44, 46). When the module is in operation, the logic circuit (52) also makes it possible for the supply voltage Vcc, the reinitialization signal RAZ, and the clock signal CLK to be applied to their corresponding terminals. The electronic circuit (52) includes a wraparound shift register (53), with three outputs S1, S2, S3 and two logic gates (54, 55). In the example shown, the logic gates (54, 55) are NAND gates with two inputs each. The first input of the first gate (54) is connected to the first output S1 of the register (53), and the second input of this first gate is connected to the third output $3 of the register. The output of this first gate is connected to the control input of the multiplexer (50). The first input of the second gate (55) is connected to the second output ($2) of the shift register, and the second input of this second gate (55) is connected to the third output $3 of the register. It is the output of this second gate (55) that makes it possible for the pilot control to put the module into service, as will be explained hereinafter. The input of the shift register (53) is connected to the common point between a first terminal of a resistor R1 and the cathode of a Zener diode Z1, whose anode is connected to ground. The second terminal of the resistor R1 is connected to the conductor DTR, in such a way that the input voltage of the register is regulated and set to a level that is adapted by means of the Zener diode Z1.

The output of the second gate (55) of the circuit (52) is connected to the base of a transistor T1, on the one hand, and to the cathode of a second Zener diode Z2 on the other, the anode of that diode being connected to ground. The collector of this transistor T1 is connected to the positive pole of a battery (53). The emitter of the transistor T1 is connected on the one hand to the conductor that furnishes the supply voltage Vcc to the module, and on the other to the excitation input of a clock circuit (57) designated by the letter "H", that makes it possible to furnish the clock signal CLK to the module. The clock circuit (57) is a quartz circuit, for example, in a manner known per se. Finally, the emitter of the transistor T1 is connected to the input of a monostable multivibrator (58), whose output is connected to either the reinitialization terminal RAZ of the connector (45) (FIG. 6), or directly to the reinitialization terminal RAZ of the module (46) (FIG. 7).

In operation, the transistor T1 becomes conducting when a positive voltage is applied to its base, hence when a positive signal is present at the output of the NAND gate (55). In that case, by way of the transistor T1, the battery (56) feeds a supply voltage Vcc to the module, whose correct level is adjusted because of the presence of the Zener diode Z2. Simultaneously, the clock generator (57) begins to operate because its control input is excited, and the monostable multivibrator circuit (58) furnishes a reinitialization control pulse for the module circuits.

The voltage required for power supply to the module is 5 V. In the case where the battery (56) is for instance a 9-volt battery, Zener diode Z2 is selected appropriately so that the voltage that appears between the emitter of the transistor T1 and ground will be 5 V. As has been explained, the input/output terminal of the connector (45) (FIG. 6) or the input/output terminal of the module (FIG. 7) is connected to the second input of the multiplexer (50). It is also connected to a first terminal of a resistor R2, whose second terminal is connected to the conductor TXD. A Zener diode Z3 is also connected between the first terminal of the resistor R2 and ground, and its function is to make the levels of the voltages of the signals coming from TXD compatible with the voltage levels necessary for the module. In fact, in practice, the signal TXD is sent between 0 and 12 V, and the Zener diode Z3 makes it possible to stabilize the deviation of this signal TXD between 0 and 5 V.

Thus when the signals are sent over the conductor TXD, they are transmitted at a level appropriate for the input/output terminal I/O of the module (44) or (45), and when the module sends signals in turn, they are also available at the second input of the multiplexer. Depending on the state of the signal appearing at the control input of the multiplexer, the signals appearing at a second input of the multiplexer are or are not available at the output of the multiplexer. The control of the multiplexer will be studied in greater detail hereinafter.

The positive pole of the battery (56) is connected to the conductor RTS by way of a charging circuit, constituted by a series-connected resistor R3 and diode D1. Because of the presence of the battery (56), the power furnished by way of the transistor T1 to the electronic circuits of the module (41) is sufficient.

Moreover, the positive pole of the battery (56) is connected to the collector of the second transistor (T2), of the npn type, whose emitter furnishes the supply voltage of the pickup controller (47). The base of the second transistor T2 is connected on the one hand to the circuit ground by way of a Zener diode Z4, and on the other to a conductor RTS by way of a resistor R4. The Zener diode Z4 makes it possible to regulate the supply voltage furnished to the pickup controller (47). When there is no voltage present at the level of the conductor RTS, then the transistors T1 and T2 are blocked, which economizes on the energy of the battery (56).

Although this has not been shown, in order not to overburden the drawing figures, the signal originating in the emitter of the transistor T2 can be used, if necessary, to furnish the supply voltage of the multiplexer (50), the wraparound shift register (53), and the logic gates (54, 55).

Accordingly, the electronic circuit of FIGS. 6 or 7 makes it possible to connect the device to a standard interface, such as a V24 or RS232 interface, by way of a single electric cord. It requires no other connection whatever for supplying power to the device and to its communication channel.

Aside from the problems of power supply, a second problem is solved, since generally the conventional pickups use a 1200 baud transmission speed, while the memory and/or microprocessor devices require a data transmission speed of at least 9600 baud. The circuit allows these transmission speeds to be obtained without disadvantage. Finally, it allows the signals of the pickup and those of the module to be switched over the same channel (RXD) based on signals generated by the standard interface.

In the proposed embodiment, the assembly constituted by the pickup or the module dialogs with the processing unit by way of the signals TXD, DTR, RXD and RTS, the voltage levels of which are typically between −12 V and +12 V. The deviation of the signal TXD is stabilized at 0 to 5 V, to make it compatible with the voltage levels of the module, by way of the Zener diode Z3, in such a way that the conductor TXD can be used to send messages in the direction of the module, which in the case of FIG. 6 is constituted by a removable medium (44) and in the case of FIG. 7 by a nonremovable medium (46).

At the time the device is connected, the voltage levels intended for the conductors RTS, RXD, DTR, TXD are at −12 V. In that case, the state of the outputs S1, S2, S3 of the wraparound register (53) does not matter.

When the device is initialized, DTR is kept at −12 V, and RTS changes to +12 V, so that the device and in particular the amplifier (51) and the register (53) are supplied with power.

At the same moment, the register (53) is initialized, such that its first output (S1) changes to a logic level 0 (low state), for instance, while the other two outputs (S2, S3) change to a logic level (1) (high state). As a result, the output S54 of the first logic gate (54) changes to the high state, while the output S55 of the second logic gate changes to the low state. As a consequence, the first transistor T1 remains blocked, with the effect that the module does not operate. The high state of the output S54 of the first multivibrator positions the multiplexer in a configuration such that it is the signals originating in the pickup controller (47) that are available at the output of the multiplexer (50) (first operating state).

After the output of the pickup controller (47) has been put into communication with the input of the amplifier (51), by way of the multiplexer (50), the pickup controller sends its typical initial recognition sequence, for example constituted by a train of four eight-bit bytes.

In the state that has just been described, the device functions entirely like a conventional pointing peripheral. As a result, when one or the other of the means incorporated in the housing for converting its motion into electrical signals is prompted, the pickup controller (47) sends three eight-bit control bytes at the rate of 1200 baud in the conventional manner. The bytes are sent after a calculation performed by the pickup controller, and are a function of the direction and value of displacement of each of the means (48, 49) that convert the motion into electrical signals:

a first byte, for example, gives the direction of displacement;
a second byte gives the value of displacement of one of the means;
a third byte gives the value of displacement of the second means, for example.

When the processing unit of the machine seeks to establish dialog with the module (44) or (46), it sends a positive pulse of +12 V over the conductor DTR for a relatively long period, for example on the order of 10 ms. The register is then shifted by one action, i.e., a switchover, such that its second output S2 changes to the logic level 0 (low state), with its first output S1 then changing to the logic state 1 (high level), and its third output S3 remains in its previous state, in other words at the high logic level. In that case, the output S54 of the first NAND gate (54) flips to the low state, and simultaneously the output S55 of the second NAND gate (55) flips to the high state. As a result, the first transistor T1 becomes conducting, which brings about the following events:

a supply voltage Vcc is applied to the module by way of the corresponding terminal of the connector (45), in the case where the module is removable, or directly to the proper terminal of the module (46), when the module is integrated;
a clock signal CLK is generated by the generator (57) and is applied to the corresponding input of the module;
the monostable circuit (58) outputs a pulse RAZ for reinitializing the module;
now that the control signal of the multiplexer (50) has been modified, it is the signals that appear at its second input that are transmitted at the output in the direction of the amplifier (51), in other words the signals that appear at the input/output terminal I/O of the module (second operating state).

In this state, the device enables a dialog to be established between the processing machine (or the computer) and the module in both directions, at any arbitrary speed, by way of the links TXD and RXD. In particular, the computer can receive the response of the module to the reinitialization signal RAZ and can then dialog at a transmission speed of 9600 baud, for example. The computer is then capable, in this configuration, of sending orders by way of the conductor TXD, so that the module will perform processing and will output a response, for example the result of its calculation, by way of its input/output terminal I/O; this response is then transmitted to the computer over the conductor RXD.

It should be noted, however, that in this state no displacement of the pickup can be taken into account, since the output of the pickup controller (47) is not in communication with the processing unit. Highly advantageously, the electronic circuit of FIG. 6 or FIG. 7 enables the module to execute calculations or functions while the displacement pickup is in use. As a result it is not always necessary for the results of calculations by the module to be retransmitted to the computer; the module can simply perform the calculations, put the results in a queue, and retransmits the results as soon as the output is in communication with the conductor RXD.

The third operating state is consecutive to a new positive pulse of +12 V over the line DTR. In that case, the shift register shifts again by one multivibrator, such that its third output S3 changes to the logic state 0 (low state), its second output S2 then again changes to the logic state 1 (high state), and its first output S1 remains at the high state where it was beforehand. In this configuration, the output S54 of the first NAND gate (54) is then in the high state, putting the multiplexer (50) into a configuration such that it is the signals appearing at the output of the pickup controller (47) that are retransmitted toward the amplifier (51), and hence over the conductor RXD, but simultaneously the output S55 of the second gate (55) is also in the high state, thereby bringing about the operation of the module.

However, in that state, no result of any calculation or of any function executed by the module can be transmitted to the computer, since the signals that are output are those originating in the pickup controller.

It is possible, however, to change from this state, in which the pickup and the module are simultaneously active, to the state in which only the pickup is in operation and the results can be transmitted to the computer, without the module circuits being reinitialized, in order to avoid losing the results of calculation.

As has been explained, the shift register is a wraparound register, of the kind where the change from one state to the other is done by a well-defined chronology, and changing from the third state to the second state requires a trip through the first state as in looped scrolling between the various states: state 1→state 2→state 3→state 1.

The following table shows the various states that the outputs S1, S2, S3 of the register (53) can assume, and the corresponding state of the outputs S54 and S55 of the first and second logic gates (54 and 55) connected to the outputs of the register.

|  | S1 | S2 | S3 | S54 | S55 |
|---|---|---|---|---|---|
| connection to power | x | x | x | x | x |
| state 1 | 0 | 1 | 1 | 1 | 0 |
| state 2 | 1 | 0 | 1 | 0 | 1 |
| state 3 | 1 | 1 | 0 | 1 | 1 |

Upon connection to power, the state of the various outputs of the register and gates does not matter. This has been symbolically represented with an x in the table.

State 1 is the one that immediately follows the reinitialization of the circuits of the device, putting only the pointing functions into service. State 2 is the one that follows state 1 and puts the module state into operation and takes only the state of the module into account. State 3 is the one that allows the module to operate while the displacements of the pickup are taken into account.

It will be recalled that the change from state 1 to state 2, or from state 2 to state 3, or from state 3 to state 1 is done by applying a positive pulse of +12 V for a relatively long period of time, approximately 10 ms, at the level of the conductor DTR. The problem that arises in a change from state 3 to state 2 is that it is necessary first to return to state 1, but it is also a requirement that the circuits of the module not be reinitialized, lest the results calculated when the module is in state 3 be at risk of being lost or altered.

Now as has been explained, the change to state 1 makes the transistor T1 nonconducting. However, since there are always filtering capacitors or parasitic capacitances inside electronic circuits, the application of two extremely brief and extremely close pulses makes it possible to change from state 3 to state 2 without blocking by this transistor T1 and accordingly without deactivating the clock circuit (51) and without applying a reinitialization pulse RAZ via the monostable circuit (58).

In a particular embodiment, relatively brief pulses are applied, for example on the order of approximately 2 ms. The power supply to the module is accordingly not interrupted, which makes it possible for the medium to continue in normal operation during the phase of switching from state 3 to state 2 via state 1.

It is understood that the embodiments that have been described are in no way limiting. In particular, using gates (54, 55) of the NAND type at the output of the wraparound shift register (53) has been described. This type of gate is acceptable only if after reinitialization the first output S1 of the register (53) is in the low state while the other two outputs S2, S3 are in the high state (first operating state), and if following a first pulse at the input of a register the second gate changes to the low state, with the first then being in the high state, and the third remaining in the high state, and so forth. Contrarily, if after the reinitialization of the register (53), its first output S1 were in the high state while the other two were in the low state, and so forth, then the gates would necessarily no longer be NAND gates but rather EXCLUSIVE OR gates.

Other variants are conceivable, in which state 1 is that in which not the pickup controller (47) but rather the module (44, 46) is taken into account. It is possible to imagine another sequence of states, by using an appropriate electronic logic circuit (52). The conversions that would be necessary are within the competence of one skilled in the art and need not be described further in the present application.

The circuits of FIGS. 6 or FIG. 7 may easily be made on the basis of a conventional circuit contained in a pointing peripheral such as a mouse. In fact, among other features, it makes use of the already-existing pickup controller and of the conventional links encountered in this type of pickup. Adaptations have been made, that is, the addition of the battery (56), the multiplexer (50), the logic circuit (52), and the various voltage adapter or driver devices. Nevertheless, this circuit is not completely satisfactory, because it does not enable the change directly from one state to an arbitrary other one. For example, it does not allow changing from state 1 to state 3, directly, or even from state 2 to state 1, or state 3 to state 2. Hence the computer must output signals of different durations, depending on the type of dialog it seeks to establish.

The circuit of FIG. 8 shows an embodiment with which the number of components can be reduced and a desired transmission speed obtained, using a shared protocol for the pickup in the reader, and which enables changing directly from one state to the other without going through an intermediate state as in the preceding case.

In FIG. 8, the case has been shown where the module is removable and as a consequence the electronic circuits of the module are put into communication with the electronic circuits of the device by way of a connector (45) incorporated into the device.

Naturally, in the event the module were not removable, the layout would be identical, except for the connector.

The principle employed in this electronic circuit consists in using a microcontroller (59) to assure the management as a pointing peripheral and the management of the module.

In fact, the microcontroller (59) replaces the logic circuit (52), the multiplexer (50), and the pickup controller (47).

In the embodiment of FIG. 8, the microcontroller (59) of the pickup/reader and the module (60) receive their supply voltage Vcc with the aid of an electrical circuit similar to that of FIGS. 6 and 7.

The power supply Vcc of the microcontroller (59) and that of the module (60) are obtained from the positive voltage furnished at the level of the conductor RTS.

More precisely, the terminal for the supply voltage Vcc of the microcontroller (59) is connected to the emitter of a first npn transistor T3, whose base is connected to ground by way of a first Zener diode Z5, in order to regulate the voltage Vcc furnished to the applicable input terminal of the microcontroller.

On the other hand, the conductor RTS is connected to a first terminal of a first resistor R5, whose second terminal is connected to the anode of a diode D2, whose cathode is in turn connected to the connector of the first transistor T3.

A first terminal of a second resistor R6 is connected to the common point of the conductor RTS and the first terminal of the first resistor R5. The second terminal of the second resistor R6 is connected to the base of the first transistor T3.

The positive pole of a battery (61) is connected to the connector of the first transistor T3, and the negative pole of the battery is connected to ground. Thus the battery (61) can be charged by way of the first resistor R5 and the diode D2 when a voltage is present on the conductor RTS. Moreover, the positive pole of the battery (61) is also connected to the connector of a second transistor T4, whose base is connected to ground by way of a second Zener diode Z6. The emitter of this second transistor T4 is connected to the terminal for supplying the voltage Vcc of the module (60), optionally by way of a connector (66), when the module is removable. The base of the second transistor T4 is also connected to one output of the microcontroller by way of a third resistor R7. This output of the microcontroller furnishes a positive signal when it is necessary for the module (60) to be supplied, as will be explained hereinafter.

However, considering the circuits and their description above, it will be readily understood that the first transistor T3 on the one hand does not conduct except when a voltage is present at the level of the conductor RTS. The microcontroller (59) is supplied only when a voltage is present on the conductor RTS, and the second transistor T4 can therefore not conduct unless a voltage is furnished to the microcontroller (59), thus economizing on the energy of the battery when the device is not being supplied.

Besides its input for supply of voltage Vcc and its output connected to the base of the second transistor T4 by way of the third resistor R7, the microcontroller (59) includes a certain number of other input and/or output terminals. It includes two inputs that receive the signals originating from the means (62, 63) enabling conversion of the motion of the pickup into electrical signals, enabling the microcontroller to determine the direction and value of the displacement. It also includes an interrupt input INT connected on the one hand to a first terminal of a resistor R8, whose second terminal is connected to the conductor DTR, and on the other hand to a Zener diode Z7 which in turn is connected to ground. The role of this interrupt input is to receive pulses coming from the conductor DTR, in order to program switch the microcontroller to the module and/or to the means (62, 63) for pointing control.

The roles of the resistor R8 and the Zener diode Z7 are to make the voltage levels of the signals output at the level of the conductor DTR compatible with the voltage levels required at the input to the microcontroller (59). It will be recalled that the signals sent over DTR are generally between −12 V and +12 V, while the microcontroller requires signals on the order of 5 V.

The microcontroller includes one other input connected to the conductor TXD by way of a bridge constituted by a resistor R9 and a Zener diode Z8. The resistor R9 is intercalated in series between the conductor TXD and the aforementioned input terminal to the microcontroller, and the Zener diode is intercalated between the input terminal and ground. This input receives the signals that have to be retransmitted afterward to the module (60), when a dialog is to be established between the module and the processing unit.

The microcontroller (59) also includes an input/output terminal which allows transmission of the signals coming from the conductor TXD toward the input/output terminal I/O of the module, and reception of the signals from the latter that are to be retransmitted to the processing unit by way of the conductor RXD. To this end, one output of the microcontroller (59) is connected to the conductor RXD by way of an operational amplifier (64), whose role is to return the level of the signals leaving the microcontroller to one that is compatible with the signals to be carried over the conductor RXD. The operational amplifier is supplied with positive voltage by the conductor RTS, to which it is connected directly, and is supplied with negative voltage by the conductor DTR, to which it is also connected.

The microcontroller (59) includes an output for controlling a clock generator circuit (65), whose output is connected to the clock input CLK of the module. When a signal is present at the output in question of the microcontroller (59), the clock generator (65) furnishes an appropriate clock signal. Finally, the microcontroller

(59) includes one output connected directly to the reinitialization input RAZ of the module, which applies a reinitialization pulse RAZ to the module when necessary.

This arrangement makes it possible for interrupt pulses to be sent, by way of the conductor DTR, to the associated input of the microcontroller, through the voltage adaptor circuit constituted by the resistor R8 and the Zener diode Z7.

The operation of the device may be similar to that described in conjunction with FIGS. 6 and 7, as long as the program switching or signal routing functions are assured by a program that is located within the memory of the microcontroller. This program tests the signals sent on the conductor DTR and assures the change among the various states described in conjunction with FIGS. 6 and 7.

For example, positive pulses may be sent on the conductor DTR by the processing unit to which the device is connected, whenever a change of state is necessary.

In a variant not shown, the conductor DTR is not connected to any input of the microcontroller (59), but serves solely to supply negative voltage to the amplifier (64). In that case, the instructions for program switching could be sent in encoded form on the conductor TXD, and the microcontroller would then interpret the signals coming from TXD to position its outputs in a configuration corresponding to one of the three states described above. This variant would have the advantage of freeing the line DTR to assure solely the supply of −12 V to the operational amplifier (64).

The importance of the assembly of FIG. 8 or of its variant (not shown) in which encoded signals would be sent on the conductor TXD to drive the microcontroller is that it makes it possible for only the appropriate outputs of the microcontroller to send the necessary signals, as a function of the state desired. By way of example, when the device is in a first state, it is the signals output by the position pickups that are taken into account, so that signals that are a function of the pickup displacement or position are sent on the conductor RXD.

At the time of the change from the first state to the second state, the clock signal generator (65) is activated via the corresponding output of the microcontroller; its output that is connected to the base of the transistor T4 by way of the resistor R7 outputs a positive signal to make this transistor conducting, and a reinitialization pulse is output to the reinitialization input RAZ of the module (60). Simultaneously, the input/output line I/O of the module is put into communication with the conductor RXD by way of the internal circuits of the microcontroller and of the operational amplifier (64).

Upon the change from the second state to the third state, the signal controlling the clock circuit (65) is maintained; the signal making the transistor T4 conducting is also maintained, but no reinitialization signal whatever is output. The same is true when the device is to return from state 3 to state 2.

Figure 9:
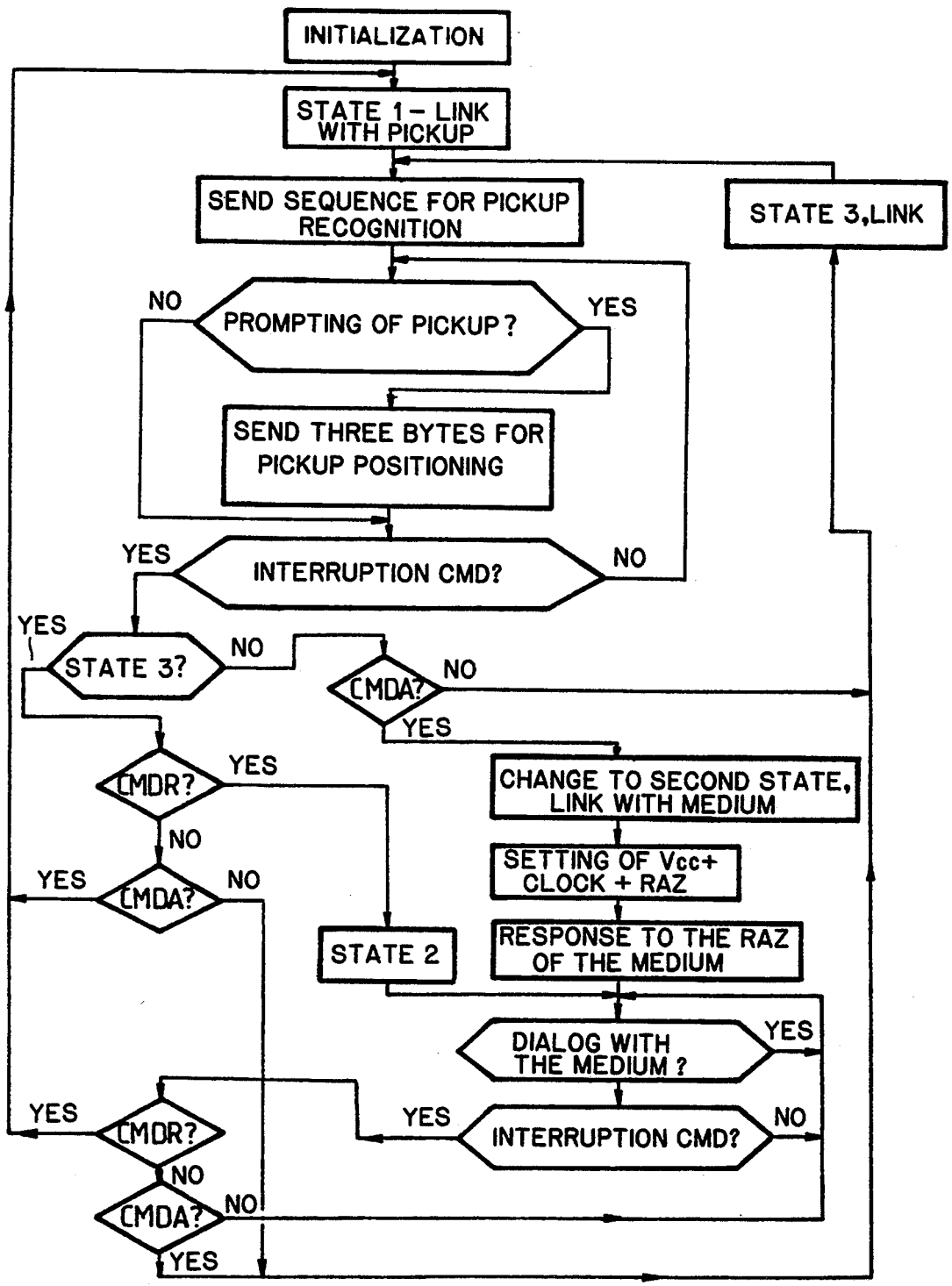
FIG. 9 is a flowchart showing the possible operation of the circuit of FIG. 8.

By way of example, the device described in conjunction with FIG. 8, or its variant in which the link TXD serves to send encoded signals whenever a change of state is necessary, may function in accordance with the flow chart of FIG. 9.

Upon initialization, the pickup/reader microcontroller (59) is in the pickup mode, in other words in a state corresponding to state 1 of FIGS. 6 and 7, and it outputs the corresponding recognition sequence.

The scanning program for the displacement of the device then becomes active and outputs the necessary signals for detection of motion, when prompted by the device.

If a pulse is sent on DTR, or if the microcontroller receives an appropriate instruction on TXD, the program of the pickup is then interrupted; this action is embodied physically by the appearance of a CMD interrupt. At that point, a test is made to determine which type of interruption is involved. In other words to determine whether the subject of the request is the change to the preceding state (CMDR interrupt) or the change to the following state (CMDA interrupt).

Moreover, for greater security in processing requests for interruption, when the device is in either state 1 or state 3, in which the signals of the position pickup are transmitted on the conductor DTR, a complementary test is done to verify in fact which state, of these two states, the device is in.

If the device is in state 1, a CMDA interrupt would have the effect of causing the change to state 2, in other words the power supply Vcc of the module (60) would be established, and the sequence of clock signals and resetting of the module to zero would be tripped. Contrarily, if the device is in state 1 and a CMDR interrupt appears, the device would then be put in state 3, that is, the supply voltage would be furnished to the module, and the clock signal and the reset to zero of the module would be established, such that the module (60) would operate, and the signals originating from the position pickup would be transmitted over the link DTR.

If the CMDR interrupt, whose purpose is to change the device to state 2, appears while the device is in state 3, then the supply voltage Vcc of the module (60) is maintained, as is the clock voltage, but no signal for reinitializing the module is output. The output RXD of the device receives the signals originating in the input-/output terminal I/O of the module.

In the event that the interrupt signals are generated on the conductor DTR, a CMDA interrupt can correspond to the detection of a single pulse on this conductor within a given period of time, for example of less than 10 ms. A CMDR interrupt can itself correspond to the detection of two pulses in the same period of time. This is merely an illustrative example, and any equivalent provision is within the competence of one skilled in the art.

When the link TXD is used to receive the interrupt signals, a CMDA interrupt can correspond to a first encoded signal, while a CMDR interrupt corresponds to a second encoded signal. The sole condition in this case is that these encoded signals be differentiated from those that may be taken into account by the module (60). For example, they must not correspond to a command code of the module.

It is understood that for maximum security to be assured with the aid of a device according to the invention, it is desirable for the module to be personalized, whether it is removable or incorporated definitively inside the housing. Thus each module may be differentiated by a different secret password, or by any other method in the prior art applicable to microcomputer and/or memory cards.

I claim:

1. A portable, user-controlled pointing peripheral for positioning a cursor on a display of a data processing machine, comprising:

pointing means (47, 48, 49) for generating X-Y information and generating a pointing signal therefrom;

module (44) having a processing means and an interface adapted to receive information from and send information to said processing machine;

a first standard interface for connecting said pointing peripheral with a general purpose peripheral interface of said processing machine, said first standard interface comprising a plurality of shared conductors including a data sending conductor, a data receiving conductor and control conductors, said module receiving information from the processing machine by said data receiving conductor; and program switching means (50, 52) connected to an output of said pointing means and of said module, said program switching means being controlled by at least one control signal transmitted by said processing machine over one of said plurality of conductors so that either said pointing signal or an output signal of said module is transmitted on said data sending conductor.

2. The peripheral of claim 50, wherein said program switching means are adapted to put the device in three states:

a first state in which said pointing means are active and said pointing signal is transmitted to said processing machine while said module is inactive;

a second state in which said module is active and exchanges information with said processing machine while said pointing means are inactive; and a third state in which said pointing means are active and said pointing signal is transmitted to said processing machine internal processing and/or receiving information from said processing machine.

3. The peripheral of claim 2, wherein said module is of the type requiring a clock signal and a reinitialization signal, said peripheral being operable to provide said clock signal for at least the duration of the second and third states, and said reinitialization signal only at the time of a change from the first to the second state.

4. The peripheral of claim 1, which includes a battery (56), a charging circuit (R3, D1) for receiving a voltage furnished by one of said conductors of said first interface, said battery supplying said module and said program switching means.

5. The peripheral of claim 1, wherein said module has a second standard interface (45) of the serial type operable to receive and send information on the same pin connected to said data receiving conductor of said first interface and to said program switching means.

6. The peripheral of claim 1, wherein said control signal for controlling said program switching means is transmitted on said data receiving conductor of said first standard interface and is distinguishable from an information signal sent to the module on the same conductor.

7. The peripheral of claim 1, wherein said control signal for controlling said program switching means is transmitted on a control conductor of said first standard interface referred to as a Data Terminal Ready conductor (DTR), a standard Data Terminal Ready signal from the machine providing a first voltage level on said conductor to enable the program switching means to transmit to the machine any signal provided at an input thereof while said control signal provides a second voltage level, to let the program switching means pass from a first state to a second state.

* * * * *

UNITED STATES PATENT AND TRADEMARK OFFICE
CERTIFICATE OF CORRECTION

PATENT NO. : 5,341,421
DATED : August 23, 1994
INVENTOR(S) : Michel UGON

It is certified that error appears in the above-indentified patent and that said Letters Patent is hereby corrected as shown below:

On the cover page [73] "Trapps" should be --Trappes--.

Col. 19, line 3 (Claim 1, line 3) "module (44)" should be --a module (44)--.

Col. 19, line 24 (Claim 2, line 1) "claim 50" should be --claim 1--.

Col. 19, line 36 and Col. 20 lines 1 and 2 (Claim 2, line 12 and lines 13 and 14) after the words "processing machine" delete "internal processing and/or receiving information from said processing machine" and substitute the following --while said module is at least one of active for internal processing and receiving information from said processing means--.

Signed and Sealed this

Seventh Day of November, 1995

Attest:

BRUCE LEHMAN

Attesting Officer

Commissioner of Patents and Trademarks